(12) United States Patent
Yi et al.

(10) Patent No.: US 9,768,959 B2
(45) Date of Patent: Sep. 19, 2017

(54) COMPUTER SECURITY SYSTEM AND METHOD TO PROTECT AGAINST KEYSTROKE LOGGING

(71) Applicant: Acxiom Corporation, Little Rock, AR (US)

(72) Inventors: Gon Yi, Conway, AR (US); William C. Smith, Conway, AR (US); Connie Marie Ardwin, Bryant, AR (US)

(73) Assignee: Acxiom Corporation, Conway, AR (US)

( * ) Notice: Subject to any disclaimer, the term of this patent is extended or adjusted under 35 U.S.C. 154(b) by 245 days.

(21) Appl. No.: 14/642,951

(22) Filed: Mar. 10, 2015

(65) Prior Publication Data

US 2016/0117510 A1    Apr. 28, 2016

Related U.S. Application Data

(60) Provisional application No. 62/069,154, filed on Oct. 27, 2014.

(51) Int. Cl.
| | |
|---|---|
| *H04L 9/08* | (2006.01) |
| *G06F 21/31* | (2013.01) |
| *G06F 21/83* | (2013.01) |
| *H04L 9/32* | (2006.01) |
| *H04L 29/06* | (2006.01) |

(52) U.S. Cl.
CPC ............ *H04L 9/0869* (2013.01); *G06F 21/31* (2013.01); *G06F 21/83* (2013.01); *H04L 9/3226* (2013.01); *H04L 63/0838* (2013.01); *G06F 2221/2117* (2013.01); *H04L 2209/046* (2013.01)

(58) Field of Classification Search
CPC ........ G06F 21/602; G06F 21/60; G06F 21/31; H04L 9/0869
See application file for complete search history.

(56) References Cited

U.S. PATENT DOCUMENTS

| | | | |
|---|---|---|---|
| 6,246,769 B1 * | 6/2001 | Kohut | G06Q 20/341 380/45 |
| 6,253,328 B1 | 6/2001 | Smith, Jr. | |
| 7,778,415 B2 | 8/2010 | Dyne | |
| 7,779,062 B2 | 8/2010 | Waterson | |

(Continued)

OTHER PUBLICATIONS

Warlord, Defending Passwords Against Hardware Keyloggers and Malicious Keyboards, 2010.*

(Continued)

*Primary Examiner* — Eleni Shiferaw
*Assistant Examiner* — Huan V Doan

(57) ABSTRACT

Static security credentials are replaced by pseudonyms and session-specific passwords to increase security associated with user login attempts, and specifically to defeat keylogging attacks. For each login event, the system generates unique, session-specific credentials by randomly replacing characters within a given username and password. The random character generation ensures that system login attempts use different combinations of characters, thereby producing a new username and password for every user session. The client side of the system requires only the capability to display an image file, with specialized software/hardware limited to the server side, thereby facilitating the use of the system by a wide range of client devices.

18 Claims, 6 Drawing Sheets

(56) References Cited

U.S. PATENT DOCUMENTS

| | | |
|---|---|---|
| 8,041,954 B2 | 10/2011 | Plesman |
| 8,230,514 B2 | 7/2012 | Park |
| 8,375,428 B2 | 2/2013 | Won et al. |
| 8,520,848 B1 | 8/2013 | Liu et al. |
| 8,615,662 B2 | 12/2013 | Kavsan |
| 8,667,280 B2 | 3/2014 | Sama |
| 8,712,050 B2 | 4/2014 | Delia et al. |
| 2008/0024332 A1 | 1/2008 | Simonson |
| 2008/0289035 A1 | 11/2008 | Delia et al. |
| 2009/0106827 A1* | 4/2009 | Cerruti ............... G06F 21/31 726/7 |
| 2009/0125994 A1* | 5/2009 | Fischer ............... G09C 1/00 726/6 |
| 2010/0287382 A1 | 11/2010 | Gyorffy et al. |
| 2011/0208974 A1 | 8/2011 | Goldman et al. |
| 2012/0079282 A1 | 3/2012 | Lowenstein et al. |
| 2012/0082306 A1* | 4/2012 | Hulse ............... H04L 9/36 380/28 |
| 2012/0204247 A1* | 8/2012 | Leahy ............... G06F 21/36 726/7 |
| 2014/0041005 A1* | 2/2014 | He ............... H04L 63/08 726/7 |

OTHER PUBLICATIONS

International Search Report and Written Opinion for International Application No. PCT/US2015/057322 (dated Jan. 21, 2016).
"Defending Passwords Against Hardware Keyloggers and Malicious Keyboards," www.nologin.org (Jan. 2010).
"KeyScrambler Encrypts Browser Keystrokes," lifehacker (www.lifehacker.com) (Jun. 20, 2008).
"Winfrasoft PINgrid" (www.winfrasoft.com) (downloaded Oct. 8, 2014).

* cited by examiner

COMPUTER SECURITY SYSTEM AND METHOD TO PROTECT AGAINST KEYSTROKE LOGGING

CROSS-REFERENCE TO RELATED APPLICATIONS

This application claims the benefit of provisional patent application no. 62/069,154, filed on Oct. 27, 2014. Such application is incorporated herein by reference in its entirety.

BACKGROUND

Keystroke logging is a well-known method for surreptitiously capturing user identification information, such as username, password, PIN, account number, or other identifying credentials, for malevolent purposes, from an unsuspecting user of a computing device. The method works by secretly recording and in some cases transmitting information as it is entered by the user by means of a keyboard, keypad, touchscreen, or other input device. Keystroke logging may be performed using dedicated hardware devices that are designed to "snoop" on the stream of keystrokes from the user, or by software that is installed on the user's computing device. Remote access keylogging software may periodically transmit data from the user's computer, such as by upload of that data to a remote server or by using the computing device's email software to send the information by email to a preset email address. A common target for keystroke logging attacks is username and password data, because this data may then be used to remotely access accounts held by the user. Such access may be used for various fraudulent purposes, such as gaining access to financial accounts to make unauthorized purchases or funds transfers.

BRIEF SUMMARY

In various implementations, the present invention replaces static security credentials (such as standard computer usernames and passwords) that are delivered through computers, smartphones, automated teller machines (ATMs), and other computing devices, with an electronic system that produces pseudonyms and session-specific passwords to enhance the operation of these devices by increased security. For each login event, the system generates unique, session-specific credentials by randomly replacing characters within a given (often personally-chosen) username or password or both. The random character generation algorithm ensures that system login attempts use different combinations of characters (in certain implementations, mixed-case letters and numerals), thereby requiring the user to input a new username and password for every user session using one of these devices in communication with the system.

To generate secure login credentials in certain implementations, the system randomly generates substitute "keys" for all vowels (upper and lowercase) and all numerals in the original username and password. When logging in to a session, the user types a username and password by replacing the vowels and numbers in the original credentials with substituted characters from a supplied key substitution table in a graphic image file. For every user session, the system randomly generates one or more key substitution tables as image files.

Because the specialized hardware and software systems used in certain implementations of the invention reside on the server side, the system is relatively easy to implement with any client-side computing device or platform, since it need only display an image file at the client side to facilitate operation. All other processing takes place at the server side on the system, including the generation of the image file(s) to display the key-mapping table to the user. The image for the key-mapping table is scalable in certain implementations, thereby accommodating different sizes and types of displays, including tablets and smartphones.

For the banking industry in particular, the system may be implemented with automated teller machine (ATM) terminals using a 10-digit (numerals only) substitution key-mapping table. In other implementations, the system can support the replacement of a single character with one, two, or more characters so that submitted credentials have varying length with each use, provided that the system administration is configured so that only a subset of the key is being mapped (an example would be having a numeric account number typed from a computer keyboard).

It may be seen that the invention functions to improve the operation and efficiency of computing devices by providing a more secure login experience for users. These and other features, objects, and advantages of the disclosed subject matter will become better understood from a consideration of the following detailed description and drawings.

DETAILED DESCRIPTION

Figure 1:
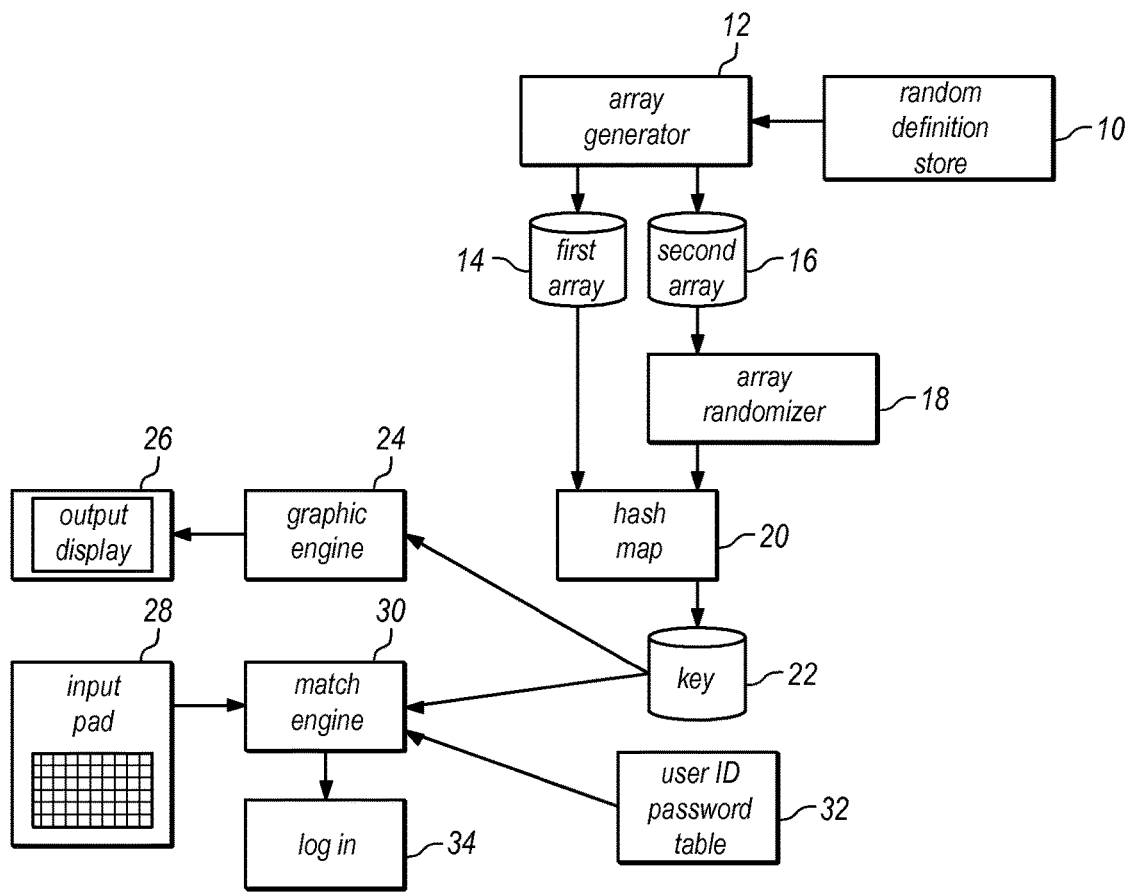
FIG. 1 is an overview of certain electronic components according to an implementation of the present invention.

In FIG. 1, random definition store 10, in certain implementations in communication with a computer server, contains a subset of characters from a set of alphanumeric characters for which randomization will occur. In a particular case, for example, the characters in random definition store 10 may be certain vowels in the modern English alphabet, a, e, i, o, and u. Array generator 12 operates to create two arrays that each contains the characters from the subset that will be subject to randomization according to the configuration file of random definition store 10. The output of array generator 12 is then first array 14 and second array 16. To randomize these characters, the output of second array 16 is input to array randomizer 18, the result of which is that second array 16 now contains the same characters as first array 14 but provides those characters in a different (randomized) order. Continuing with the example of vowels from the modern English alphabet, first array 14 will remain a, e, i, o, u after randomization, while second array 16 may have the same characters in the order e, i, u, a, o. These two arrays 14 and 16 are then combined into hash map 20, which results in key 22. Key 22 contains ordered pairs showing each original character from array 14 now matched to a random character from second array 16. Continuing with this example, the order pairs of key 22 would be a=e, e=i, i=u, o=a, and u=o.

Using key 22, graphic engine 24 builds a user display at output display 26 at which login information may be viewed by the user. In various implementations, output display 26 may be a personal computer monitor, a tablet, a smartphone, or an ATM, for example. The processing of graphic engine 24 preferably happens at a server remote from output display 26, such that the only processing required at output display 26 is the display of a graphical image provided in a predetermined format.

In response to viewing the graphical image at output display 26, the user may enter login information at input pad 28. In some cases, output display 26 and input pad 28 may be separate devices, or may be different components of the same device, or may in fact be the same component of the same device. For example, in the case of a personal computer, output display 26 may be a video screen while input pad 28 may be a keyboard. On the other hand, in the case of a tablet or smartphone, a touchscreen display may serve as both output display 26 and input pad 28, which are displayed on different sections of the touchscreen corresponding to these two different functions, or overlapping the functions into a single area of the touchscreen display.

Once information is received from the user at input pad 28, that information is transferred to match engine 30. At match engine 30, key 22 is used with the secret user ID/password data 32 related to that user to determine if the data input by the user at input pad 28 in fact matches the encrypted version of the correct user ID/password data 32. If so, then the user is permitted to login at 34 and continue processing normally.

Figure 2:
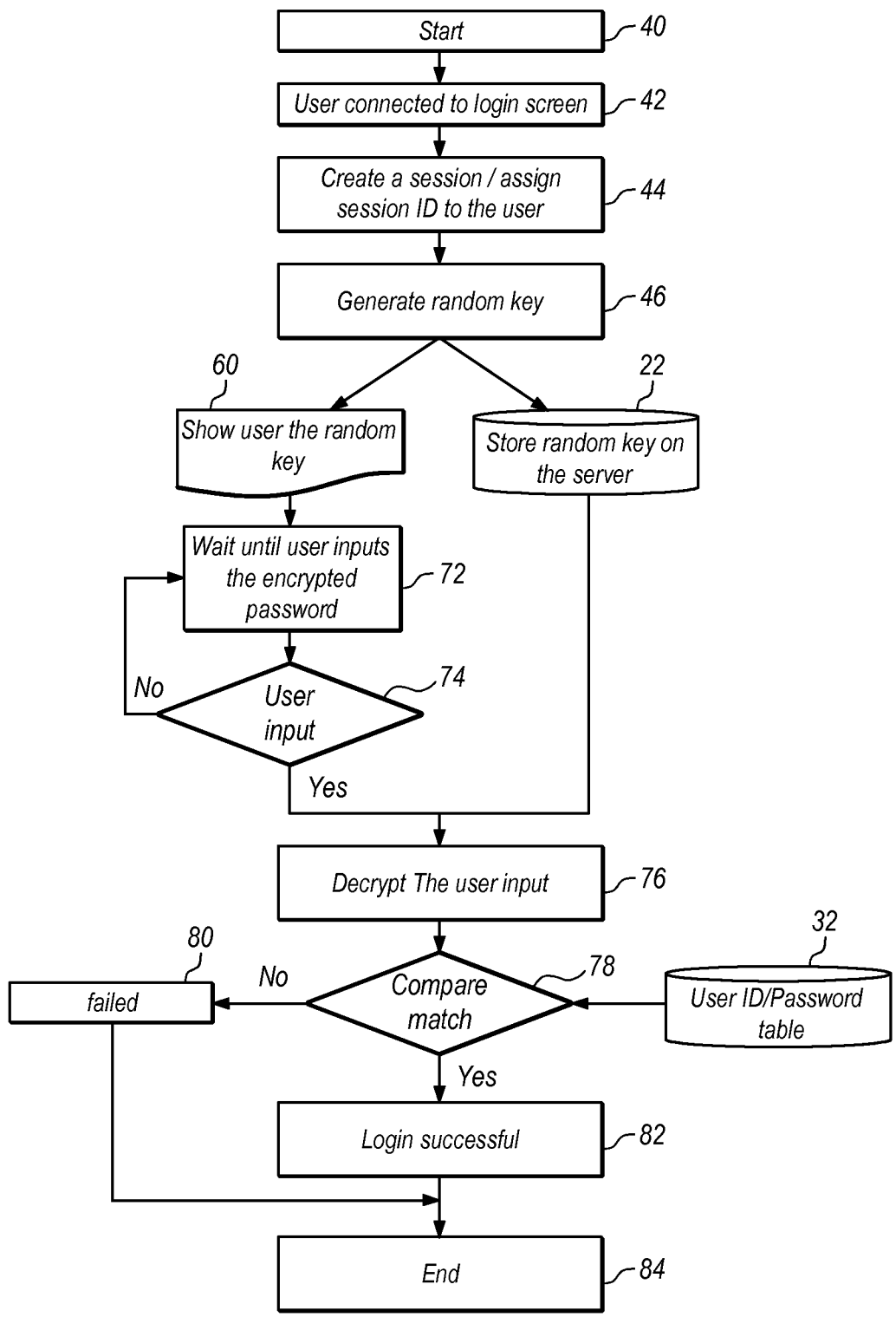
FIG. 2 is a process flow diagram according to an implementation of the present invention.
Figures 3, 4:
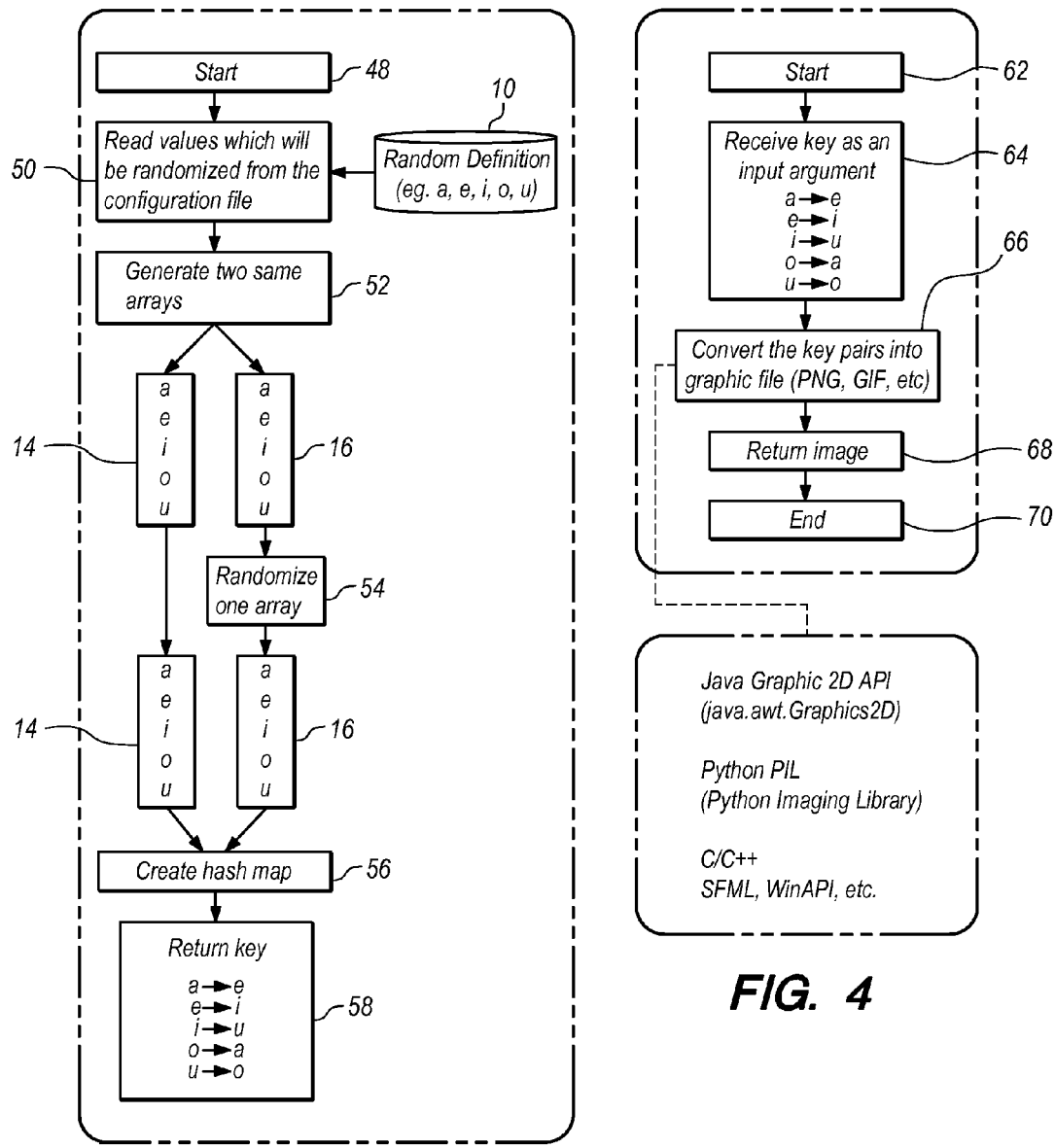
FIG. 3 is a process flow diagram of the random key generation aspect of an implementation of the present invention.
FIG. 4 is a process flow diagram of the random key display aspect of an implementation of the present invention.

FIGS. 2-4 provide process flows showing how these components, as described in FIG. 1, provide login functionality to prevent keylogging attacks against a user. As processing moves from start step 40 of FIG. 2, the user is connected to a login screen at step 42 to create a session and assign a session ID to the user as step 44. The random key 22 is generated at step 46, according to sub-processing depicted in FIG. 3. After start at step 48, the values that will be randomized are read from random definition file 10 at step 50. As in the example of FIG. 1, in this case the example shown is that the vowels a, e, i, o, and u will be part of the random definition 10. First array 14 and second array 16 are then generated at step 52. The second array 16 is randomized, the result now being that first array 14 and second array 16 present the same set of alphanumeric characters (vowels) in a different order. A hash map with these values is created at step 56, and the key 22 is returned at step 58.

Python-style pseudocode for generating key 22 in this example may be as follows:

```
# GENERATE RANDOM KEY
# random used for shuffle
```

-continued

```
import random
# above user-defined key will be used for encryption
userEncryptKey=["a", "e", "i", "o", "u"]
def generateRandomSet (key):
    # copy userEncryptKey to tempEncryptKey
    tempEncryptKey = list(key)
    # shuffle tempEncryptKey
    random.shuffle(tempEncryptKey,random.random)
    # create a hash table (dict in Python)
    dictKey = { }
    # print random key pair
    for i in range(0,len(userEncryptKey)):
        dictKey[userEncryptKey[i]]=tempEncryptKey[i]
    # return hash table
    return dictKey
# generate new random key pair using user-defined encrypt key.
dictKey = generateRandomSet(userEncryptKey)
print dictKey
```

At step 60 of FIG. 2, the random key 22 is displayed to the user. The processing used to enable this feature is depicted in FIG. 4. From start at step 62, key 22 is received as an argument at step 64. At step 66, the key pairs from key 22 are converted to an image file by graphics engine 24. This file may be in a format, for example, such as a portable network graphics (.png) file, a graphics interchange format (.gif) file, a Joint Photographic Experts Group format (JPEG) format (.jpg) file, or a portable documents format (.pdf) file. The image is returned at step 62 and the subprocess ends at step 70.

Returning to FIG. 2, the system waits after displaying the image containing key 22 until the user inputs the encrypted version of the password based upon key 22. When the user input occurs at decision step 74, the user's input is decrypted using the return key 22. Using match engine 30, a comparison is made at decision step 78 to determine if there is a match based on the actual user ID/password information stored in user ID/password table 32. If there is no match, then the login fails at step 80 and the system awaits another attempt. In certain implementations, the system may lock out the user after a given number of unsuccessful attempts. If the login is found to be successful due to a match at step 82, then processing moves to end step 84, with the user successfully logged in to the system.

Figure 5:
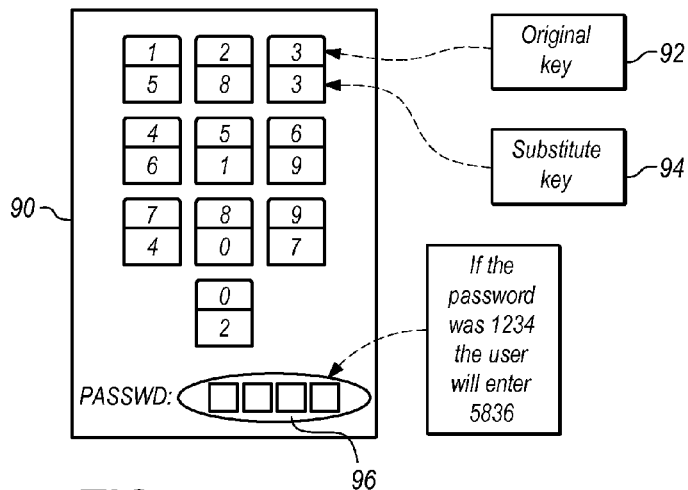
FIG. 5 is an image file displayed for login at an ATM machine according to an implementation of the present invention.

FIG. 5 illustrates the screen viewed by a user when using one particular implementation of the system, such as with an ATM, where only numbers are input such as a personal identification number (PIN) for two-step verification that also involves a card possessed by the user. On screen 90, which in this case serves as output display 26, the original keys that form part of the PIN number 92 are displayed in conjunction with the substitute keys that are found in return key 22 from corresponding pairs. In this way, the user may easily enter the encrypted substitute key by knowing the original key. For example, using the data from FIG. 5, if the user knows that his or her PIN is "1234," then the corresponding digits in the encrypted form will be "5836." The user then enters "5836" at input pad 28, which appears in password/PIN area 96.

Figure 6:
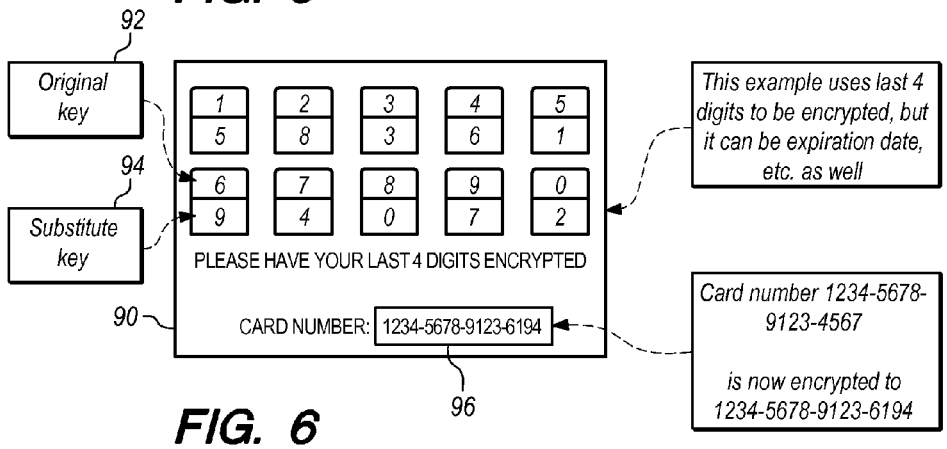
FIG. 6 is an image file displayed for entering numerical data in a one-to-one mapping according to an implementation of the present invention.

In FIG. 6, an alternative is shown in which only a portion of a number is encrypted in a manner similar to that of FIG. 5. For example, this may be a credit card number or other long number. The user can then apply the encryption of substitute keys 94 only to these last four digits and otherwise enters the original numbers 92. This approach may also be applied to other types of numbers such as expiration dates for credit cards or similar devices.

Figure 7:
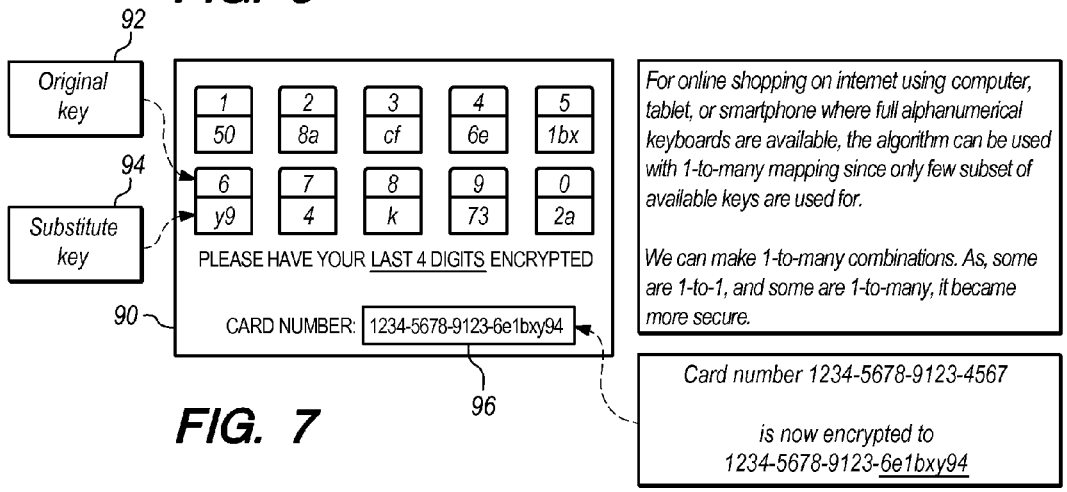
FIG. 7 is an image file displayed for entering numerical data in a one-to-many mapping according to an implementation of the present invention.

While FIG. 6 illustrates a one-to-one mapping approach, a one-to-many approach can also be used, as illustrated in FIG. 7, to make the system more secure from keylogging attacks. In this case, substitute keys 94 for each original key 92 may consist of multiple alphanumeric characters. In this particular example, the number of alphanumeric characters varies from one to three, but any number can be used in various implementations.

Figure 8:
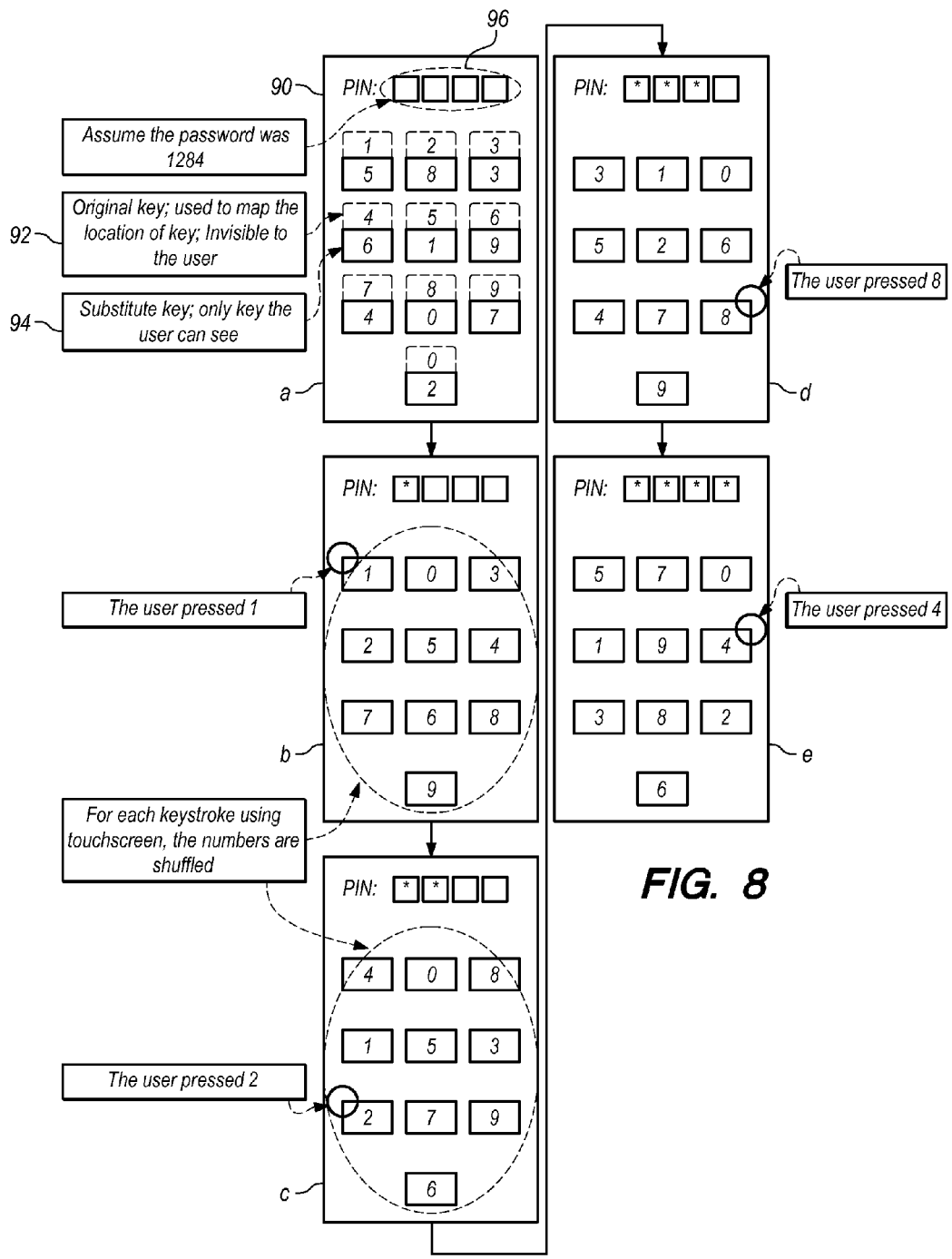
FIG. 8 is a flow diagram showing the entering of numerical data at a touchscreen display according to an implementation of the present invention.

FIG. 8 provides an example of how a combined output display 26 and input pad 28, such as a touchscreen 90, can be used in a dynamic fashion to further protect against keylogging attacks. This implementation is to prevent what is called "shouldersurfing", the act of peering over the shoulder of a person using a computing device or transaction terminal to steal the individual's login credentials. In this case, touchscreen 90 displays only substitute keys 94 to the user (original keys 92 are shown in dotted lines in FIG. 8 for clarity). An example of the display is given at step "a," with the assumption that the actual password/PIN is "1284." Assume now at step "b" a first pattern from random key 22 is used to create the display of step "b." The user will depress "1" for the first digit of the password, where a character then appears in the password/PIN area 96 to show that this first digit has been entered (even though the digit itself may be obscured for security purposes, as shown). At step "c," after depressing this first digit, the pattern is randomized again, such that a different random key 22 is used. The user enters the second number from the actual password, which is matched (invisibly to the user) to the corresponding digit. Processing proceeds likewise through steps "d" and "e" as the user enters the third and fourth digits of the password, respectively. Re-randomization thus occurs on a character-by-character basis in this implementation of the invention.

Figure 9:
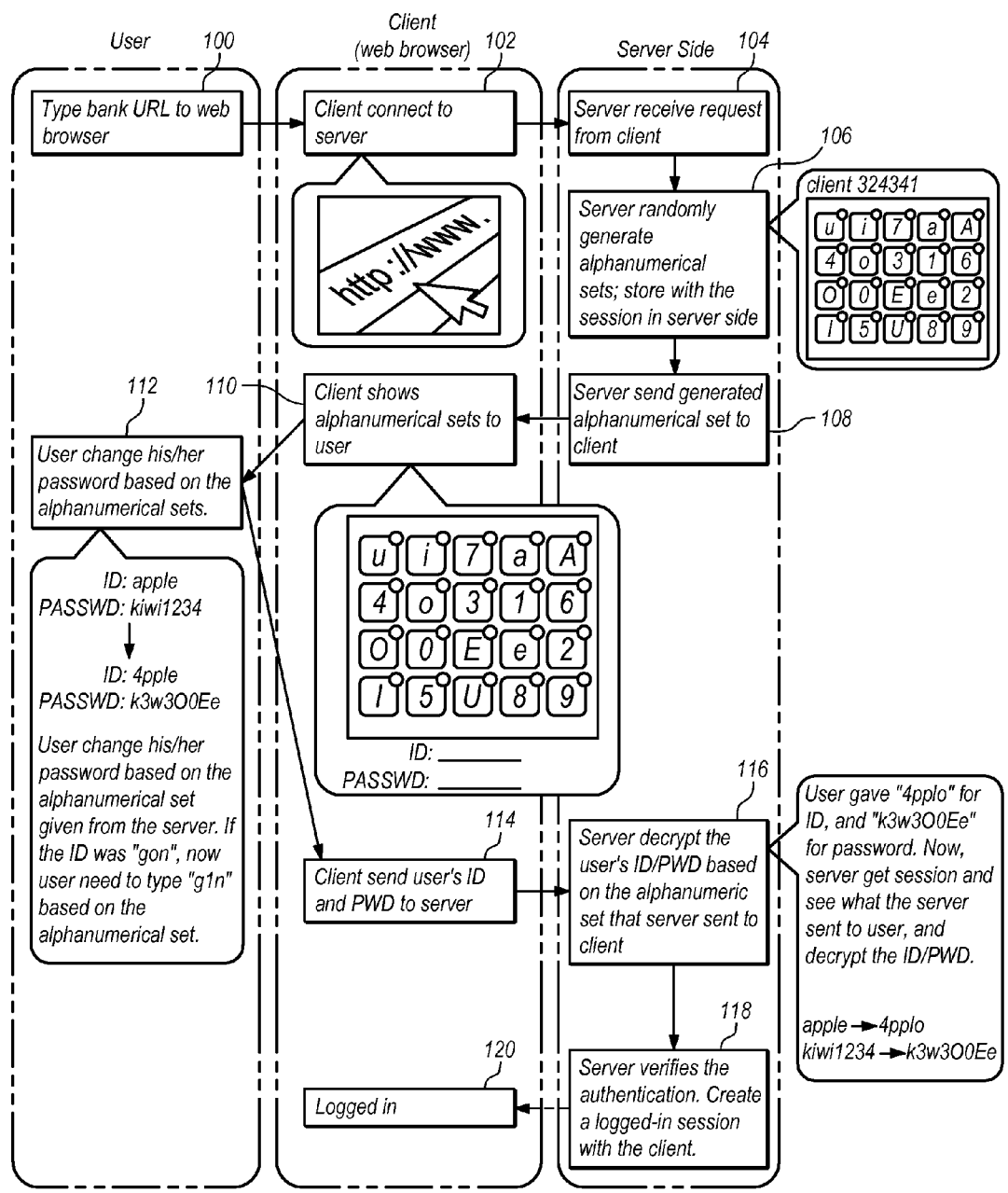
FIG. 9 is a "swim lane" diagram showing process flow according to an implementation of the present invention.

FIG. 9 provides a flow chart to illustrate one example of an implementation of the invention in a "swim lane" format to illustrate the degree to which the invention makes it possible to retain processing on the server side of a system, and thereby enhance security against keylogging attacks that typically originate at the client side. In this example, the user intends to login to his or her bank account. Using a client device such as a personal computer or smartphone, the user types the URL for the desired website into a web browser at step 100. The web browser then sends this request for loading a web page to the associated server at step 102. At the server, the request is received at step 104 and an alphanumeric key set is generated randomly at step 106 that is specific for this session, random key 22. Each alphanumeric character from the set, as defined by a system administrator, is associated with a different random letter or number. (In the example of FIG. 9, the defined set is the set of vowels and numerals.) This mapping is used to create an image file using graphic engine 24 displaying the association between each vowel and number and the associated random letter or number. The image file that graphically conveys this mapping is then sent at step 108 from the server to the user's web browser for display on the client device's screen at step 110.

Once the user sees the image on the display with the one-time mapping, the user is prompted to enter his or her username and password at step 112. In this example, the username is "apple" and the password is "kiwi1234." Using the image file as a guide, the user types the name "apple" as "4pplo," replacing the lowercase vowel "a" with the numeral "4", and lowercase vowel "e" with the lowercase "o". Likewise, the user types the password "kiwi1234" as "k3w3O0Ee," replacing the lowercase vowel "i" with the numeral "3" and replacing the 4-number string (1234) with the substitute characters "O0Ee." This information is sent by the client browser to the server at step 114, which then decrypts the username and password based on the information that was previously generated specifically for this user login session at step 116. If a match is found to a valid username and password at verification step 118, the server authenticates the user for the account at step 120. The user may then proceed normally to interact with information maintained in his or her account.

It will be seen that the random substitution of characters in both the username and the password negates the ability of hackers and keystroke loggers to identify and steal the security credentials used with computers and other computing devices. In the case of a password that features five substituted keys (in the vowel and numeral replacement example of FIG. 9, for "kiwi1234" this would be i, 1, 2, 3, 4), and without consideration for the username key substitution, the mathematical probability that someone will correctly identify all password characters is 1 in 1.86 million, or approximately 0.000054 percent.

An advantage of the implementations described herein is that the only specialized software and hardware that is required is maintained on the server only, and thus no software need be installed on the user side. The client side in the above examples may require only a standard Internet browser. More generally, any computing device may be used that is capable of displaying an image that contains the key mapping. Standard image formats used in web browsers (such as .jpg and .png files) can be supported. For closed systems such as ATMs, additional image formats can be supported.

Certain implementations described herein provide protection for both username and password, rather than just for the password as is common on many systems designed to defeat keylogging and other types of computer system security attacks. In addition, because only vowels and numbers may be replaced with this technology in certain implementations, any password protocols that require special characters with passwords or usernames, will not have those special characters replaced or removed during login verification. (Special characters include those characters that are not letters or numerals, such as but not limited to punctuation marks, monetary symbols, and other such characters that commonly appear on keyboards or text entry devices.) The system does not require passwords to be truncated, which makes it more compatible with existing systems that specify length requirements for passwords. Unlike many other authentication systems, no separate additional hardware on the client side is required to implement the technology, such as hardware tokens that generate one-time-use passwords or systems requiring a personal device, such as a mobile phone for receiving an SMS message with a one-time activation code or key.

The present invention has been described with reference to the foregoing specific implementations. These implementations are intended to be exemplary only, and not limiting to the full scope of the present invention. Many variations and modifications are possible in view of the above teachings including implementation in other languages or using different alphabets or character sets. The invention is limited only as set forth in the appended claims. All references cited herein are hereby incorporated by reference to the extent not inconsistent with the disclosure herein. Unless explicitly stated otherwise, flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Any disclosure of a range is intended to include a disclosure of all ranges within that range and all individual values within that range.

The invention claimed is:

1. A method of authenticating a user to a system, comprising the steps of:
   a. receiving a random definition store comprising a subset of characters from a character set;
   b. generating a first array comprising a first ordering of characters from the subset of characters and a second array comprising a second ordering of characters from the subset;
   c randomizing the second ordering of characters in the second array;
   d. creating a key from the first array and second array comprising a pairing of a character from the first array and a corresponding character from the second array;
   e. constructing an image file comprising an identification input image, wherein characters appearing in a pairing in the key from the first array are matched to the corresponding characters in the key from the second array;
   f. receiving a partially encrypted input identification from the user comprising an encrypted input identification part and an unencrypted input identification part;
   g. decrypting the encrypted input identification part of the partially encrypted input identification from the user using the key to replace characters from the second array with corresponding characters in the first array;
   h. comparing the decrypted input identification from the user with a stored input identification; and
   I. logging in the user if the decrypted input identification from the user matches the stored input identification.

2. The method of authenticating a user to a system of claim 1, wherein the subset of characters consists of vowels.

3. The method of authenticating a user to a system of claim 1, wherein the subset of characters consists of numerals.

4. The method of authenticating a user to a system of claim 1, wherein the subset of characters excludes special characters.

5. The method of authenticating a user to a system of claim 1, wherein the first array comprises a plurality of elements each comprising a single character, and wherein the second array comprises a plurality of elements each comprising a single character.

6. The method of authenticating a user to a system of claim 1, wherein the first array comprises a plurality of elements each comprising a single character, and wherein the second array comprises a plurality of elements in which at least one of the elements of the second array comprises a plurality of characters.

7. The method of authenticating a user to a system of claim 1, wherein the step of constructing an image file comprising an identification input image comprises the step of constructing an identification input image in which characters from the first array are not visible to the user in the identification input image.

8. The method of authenticating a user to a system of claim 7, further comprising the step of, after receiving at least one character of an encrypted input identification from the user, constructing a second image file comprising an identification input image with a different ordering of characters from the second array.

9. An apparatus for authenticating a user to a system, comprising:
   a. a random definition store comprising a subset of characters from a character set;
   b. an array generator in communication with the random definition store to produce a first and second array comprising characters from the subset of characters;
   c. an array randomizer to alter the ordering of the characters from the second array;
   d. a hash map generator to match pairs of characters from the first array and second array to produce a key;
   e. a graphic engine to generate an image file comprising characters from the key;
   f. an output display to display the image file to a user;
   g. an input pad comprising a keypad to receive characters input by a user for authentication;
   h. a match engine in communication with the input pad, the key, and a user identification table to decrypt a partially encrypted part of an input from the input pad using the key, compare the decrypted input part to corresponding user identification information from the user identification table, and login the user if a match is found.

10. The apparatus for authenticating a user to a system of claim 9, wherein the output display and the input pad comprise the same device.

11. The apparatus for authenticating a user to a system of claim 10, wherein the output display and the input pad comprise a touchscreen display.

12. The apparatus for authenticating a user to a system of claim 9, wherein the output display is a video display on an ATM automated teller machine (ATM).

13. The apparatus for authenticating a user to a system of claim 9, comprising a graphic engine to generate an image file comprising characters from the key wherein characters from the first array are mapped to corresponding characters from the second array.

14. The apparatus for authenticating a user to a system of claim 9, comprising a graphic engine to generate an image file comprising characters from the key wherein characters from the first array are not displayed in the image file.

15. The apparatus for authenticating a user to a system of claim 9, comprising a graphic engine to generate a second image file comprising characters from a second key different from the first key after the input pad receives at least one character input by a user for authentication.

16. A method for defeating keylogging attacks during a user login attempt, comprising the steps of:
   a. from a standard set of alphanumeric characters, generating an array comprising a subset of the set of alphanumeric characters;
   b. randomizing the ordering of the array;
   c. creating a key comprising a set of ordered pairs, in which each pair comprising an originally ordered character from the subset of the set of alphanumeric characters and a randomized ordered character from the subset of the set of alphanumeric characters corresponding to a same position in the array as the originally ordered character from the subset of the set of alphanumeric characters;
   d. constructing an image file comprising at least one randomized ordered character;
   e. receiving a partially encrypted input from a client device comprising one or more of a username and a password, wherein the partially encrypted input comprises at least one randomized ordered character in place of an originally ordered character; and f. unencrypting an encrypted part of the partially encrypted input using the key to determine if the one or more of a username and a password matches one or more of an unencrypted username and an unencrypted password.

17. The method of claim 16, wherein the step of constructing an image file comprising at least one randomized ordered character further comprises the step at least one ordered pair, with the originally ordered character and the randomly ordered character from the ordered pair displayed visually adjacent to each other.

18. The method of claim 16, further comprising the steps of creating a second key comprising a second set of ordered pairs, and constructing a second image file comprising at least one randomized ordered character from the second key.

\* \* \* \* \*